United States Patent [19]

Lewis

[11] Patent Number: 4,914,331

[45] Date of Patent: Apr. 3, 1990

[54] MINIMUM HEIGHT MOTOR ASSEMBLY USING ALUMINUM ENDSHIELDS

[75] Inventor: John G. Lewis, St. Louis, Mo.

[73] Assignee: Emerson Electric Co., St. Louis, Mo.

[21] Appl. No.: 227,164

[22] Filed: Aug. 2, 1988

[51] Int. Cl.[4] .................... H02K 5/00; H02K 7/10; D06F 35/00

[52] U.S. Cl. ........................ 310/90; 310/91; 68/23.3; 68/133

[58] Field of Search ............... 68/3 R, 23.3, 133; 310/259, 217, 91, 80, 89, 90, 52, 58, 216, 112

[56] References Cited

U.S. PATENT DOCUMENTS

| | | | |
|---|---|---|---|
| 3,154,704 | 10/1964 | Shaffer | 310/91 |
| 3,270,222 | 8/1966 | Shaffer | 310/91 |
| 3,671,790 | 6/1972 | Widstrand | 310/216 |
| 4,260,125 | 4/1981 | Levine | 310/91 |

FOREIGN PATENT DOCUMENTS 56-29438  3/1981  Japan ..................... 310/91

*Primary Examiner*—Peter S. Wong
*Assistant Examiner*—C. LaBalle
*Attorney, Agent, or Firm*—Polster, Polster and Lucchesi

[57] ABSTRACT

A dynamoelectric machine includes a rotor assembly and a stator assembly mounted between endshields. The endshields have axial and radial apertures to assist in motor cooling. A motor shaft extends through one endshield. A mounting plate is provided for mounting the motor. The shaft extends vertically downward through the mounting plate, to which the transmission of a machine also is mounted. A drive pulley is attached to the motor shaft and a driven pulley is attached to the transmission shaft. The pulleys are maintained in planar alignment to permit transfer of power between the pulleys and to minimize belt wear. A second endshield has a bearing housing design which provides a flush endshield surface facing upwards towards the bottom of the machine. Motor height can be varied by increasing stator assembly stack height between the endshields to the extent permitted by the overall space available between the flush surface of the one endshield and the bottom of the machine. The motor mounting arrangement provides a two point mount which is varied to permit belt replacement, while maintaining alignment between the pulleys.

15 Claims, 2 Drawing Sheets

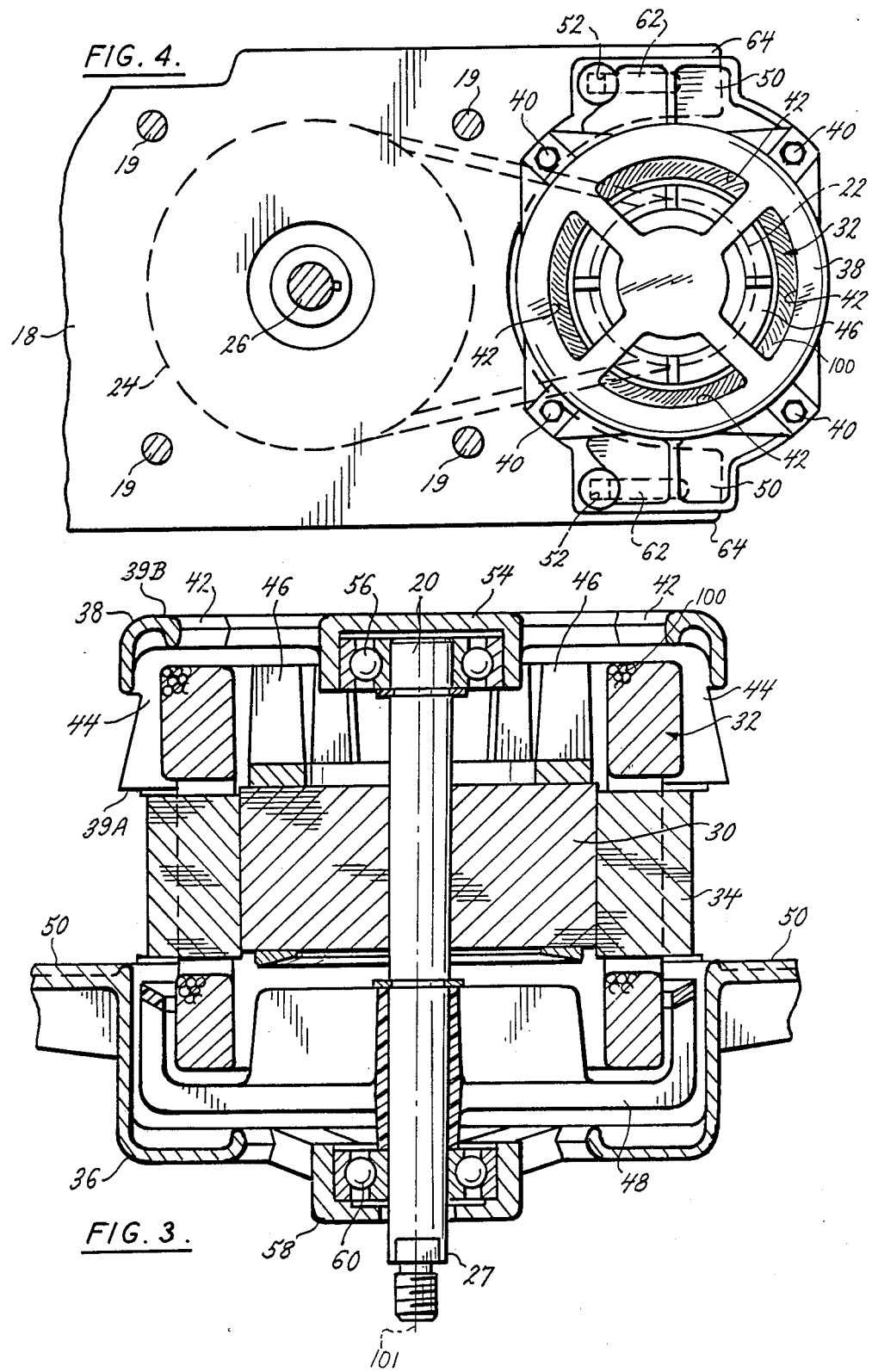

MINIMUM HEIGHT MOTOR ASSEMBLY USING ALUMINUM ENDSHIELDS

BACKGROUND OF THE INVENTION

This invention relates to electric motor assembly, and in particular to electric motor assembly for washing machine applications. While the invention is described in particular detail to such applications, those skilled in the art will recognize the applicability of the inventive concepts disclosed hereinafter.

In known washing machine applications, a drive motor for the machine is mounted vertically on or near the underside of the wash tub of the machine. Conventionally, the motor is mounted to a mounting plate through a suitable arrangement, which, in the application with which I am familiar, mounts the motor through at least the most remote, with respect to the mounting plate, endshield of the motor. The mounting plate also holds an adjacent transmission assembly, the shaft of which also passes through the mounting plate to a pulley which is driven by a belt from a pulley on the shaft of the electric motor. The transmission has a shaft extending vertically upward into the tub assembly of the washing machine to turn the agitator and to cause the spinning of the clothes tub. In the typical applications, the motor and transmission mounting arrangement suspends these assemblies in such a way that they are often subjected to a considerable amount of interactive vibration and wobbling movements. In addition, the operating environment is a consideration which must be addressed when designing motor assemblies for use in such applications. The heat added to the immediate environment of the motor from the washing operation, where hot water is used, plus the heat generated by the motor itself are factors which must be addressed in the motor design. The size of machine, specifically in relation to the washing load that will be handled under maximum load conditions, is an additional factor which must be considered in sizing the motor. Generally, only a limited amount of space exists between the bottom of the wash tub and the top of the mounting plate which supports the transmission and the motor. The available and limited space also must accommodate the pulleys on the shafts of the transmission and motor, which are mounted below the mounting plate. The total distance between the bottom of the wash machine cabinet or enclosure supporting surface and the tub bottom are design constraints that must be considered when designing a motor for the purpose of providing the appropriate level of performance to accommodate wash loads, and configuring the motor for the purpose of heat management in the washing machine environment.

It has been found that even the selection of materials, particularly those used in the endshields of the motor assembly, can contribute in a positive way, not only in addressing the heat management issues of the motor design, but also the size and configuration issues related to the limited space available in the operating environment. with respect to the issue of material selection, it has been found that when sheet metal, and specifically sheet steel, is pressed to produce endshields with bearing housings integral with the endshields, the bearing housings typically extend axially outward and along the motor arm, further limiting the space available for actual motor configuration and eventual operation. Where, as in the present invention, cast aluminum is used, the bearing housings, if required, can be made internal of the endshield, and thus, not infringe upon the limited space available between the tub and adjacent endshield. The saving of such otherwise wasted space can thus be more effectively utilized by the motor design. As indicated above, as used herein, "sizing" relates to designing the motor so that it has adequate power to handle the wash loads intended, and that relates directly to stator/rotor assembly lamination size, stack height, and the motor winding design for the motor necessary to achieve the required electrical performance. These dimensional factors are matters of great concern in view of the space limited environment in which the motor is required to operate.

It is also known that the reliability and life expectancy of the motor and its effectiveness in the application can be greatly effected by the way the motor is mounted.

An example of a mounting approach employed in prior art application designs for similar size washing machine requirements employs a mounting bracket for securing the motor to the mounting plate. The mounting plate also accommodates the transmission for the washing machine. The design uses an extension of the endshield positioned furthermost from the motor which is positioned closest to the bottom of the tub. In this known design spacing blocks are used between the bracket and the mounting plate in conjunction with long mounting bolts to make the physical connection to the mounting plate.

One problem with this mounting approach is that by placing the mounting bracket of the motor at the end remote from the mounting plate and using elongated bolts for mountings, the motor is much more susceptible to wobbling and vibration induced by its own operation, and by mechanical feedback from and through the transmission, even when the transmission is shock mounted to the mounting plate. The belt drive pulley system for powering the transmission through the motor, located on the bottom side of the mounting plate, subjects the motor mounted with the spacer blocks and long mounting bolts to considerable rotational force about the mounting plate, or thrust, which would not otherwise exist if the mounting were made directly from one or the other of the endshields to the mounting plate without the spacer blocks and long bolts. Consequently, prior art motor designs required the thrust system to compensate for the forces exerted by system operation.

It is thus an object of the present invention to reduce overall motor size, and particularly to limit the length of the motor from front to back so that it may be used in limited space applications such as a washing machine. It is yet another object of the present invention to reduce the motor size to provide more air circulation in the application space. It is another object of the present invention to provide a motor design that permits a motor mounting system that has greater motor stability and less wobble. Yet another object of the present invention is to provide a motor and mounting design that permits more secure mounting and maintenance of coplanar pulley positions for belt driving a washing machine transmission from an electric motor mounted adjacent to the transmission. It is yet another object of the present invention to select materials for fabrication of an electric motor for use in a washing machine and limited space application environment such that motor size advantages and cooling advantages may be obtained. It is still another object of the present invention to permit motor size increase that is independent of the mounting system used to attach the motor to the transmission that the motor must drive in a washing machine application. Yet another object of the present invention is to provide a mounting system that holds the distance between the motor mounting means and the mounting plate that is used to hold the motor relative to the washing machine at a minimum relative to the shaft end of the motor. Another object of the present invention is to provide a simple, easily producible motor mounting system that permits stable power communication by means of a belt and pulley system to a washing machine transmission secured to the same mounting plate in the tight spaced environment below the washtub of a washing machine.

SUMMARY OF THE INVENTION

In accordance with this invention, generally stated, a motor assembly and mounting system therefor is provided which reduces thrust levels on the motor and maximizes space utilization in the restricted environment of a domestic appliance. In the preferred embodiment, a motor includes a stator assembly and a rotor assembly interconnected by first and second motor endshields. The endshields have radial and axial apertures formed in them to permit cooling air flow at the desired volumes and velocities. The second or rear endshield has an internal bearing housing which results in the bearing housing being flush with the outer surface of the endshield. Thus, when the motor is attached to a mounting plate below the washtub with the shaft end down and the rear endshield facing up, the flat endshield surface is facing the relatively flat bottom surface of the tub and therefore the space in between can be used more effectively for motor extension or sizing necessary to provide a larger motor to power the transmission for a larger tub carrying a larger wash load. For a given size washload application, the fact that the rear endshield bearing housing is internal means that the overall motor size may be kept down and more cooling air space about the motor is available. In addition, the motor assembly of the present invention utilizes mounting ears on the front endshield of the motor to mount the motor to the mounting plate shared with the washing machine transmission. The front endshield has the rotor shaft of the motor extending through it. Since the motor mounting is accomplished at the front endshield adjacent to the mounting plate, there is no need for spacing blocks between the mounting ears on the motor and the mounting plate. Since the mounting arrangement between the mounting ears and the mounting plate at the shaft end of the motor is fixed, motor size variations, which normally mean an increase in the size of the lamination stack of the stator assembly between the two endshields, occurs above this fixed level in the space remaining between the rear endshield and the bottom surface of the overlying washtub. The relationship of the shaft mounted pulleys with the belt drive between them below the mounting plate is, thus, also maintained fixed so that there is no need for pulley adjustment or repositioning of either the motor or the transmission in order to get coplanar alignment between the two pulleys. The only movement required between the motor and the transmission relative to each other on the mounting plate is for the purpose of setting the belt tension between the motor shaft and the pulley on the transmission shaft below the mounting plate. This is accomplished by means of a parallel slot in the mounting plate through which the bolts in the mounting ears on the front endshield of the motor are moveably secured. Thus the motor assembly and mounting method of the present invention provides a motor that takes up a minimum amount of space for a given amount of power output compared to other motors. There is no external space wasted for bearing housings in space external of the motor which is at a premium, that is, space between the top or rear end of the motor and the bottom of the washing machine tub when the motor is mounted, as is normal, with its shaft facing vertically downward. The selection of cast aluminum as the material of choice for the motor endshields permits the inclusion of an internal bearing housing and the inclusion of axial and radial apertures for the desired level of cooling air flow. Because the endshields are mounted directly to the stator lamination stack, motor size increase to accommodate larger washing load demands which necessitate a larger power output motor, can be easily accomplished early, without corresponding changes in the mounting assembly. Finally the fact that motor mounting is accomplished at the shaft end of the motor which is maintained fixed relative to the mounting plate and as is the pulley end of the shaft of the transmission for the washing machine tub and agitator, means that the motor is subjected to less wobble than would be the case were it mounted otherwise and where spacer blocks would be required. More importantly, motor size increase that may be necessary for different size washing load applications can be more easily accommodated by expanding above this fixed point in the direction of the bottom of the tub without effecting the coplanar relationship between the pulleys below the plate bottom.

It will be clear to those skilled in the art that different forms of casting of the aluminum endshields to vary the aperture configurations, for example, and for accommodating the bearing housings may be made without departing from the scope and spirit of the present invention. Likewise, variations of the mounting scheme between the endshield and the mounting plate maybe made without departing from the scope and spirit of the present invention. These variations will typically arise in specific operating applications all contemplated by the present invention.

BRIEF DESCRIPTION OF THE DRAWINGS

In the drawings.

FIG. 3 is a sectional view of the motor assembly shown in FIG. 2; and

FIG. 4 is a top plan view, partly broken away, illustrating the relationship between the motor assembly of the present invention and the pulley drive for the transmission to the washing machine shown in FIG. 1.

DESCRIPTION OF THE PREFERRED EMBODIMENT

Figure 1:
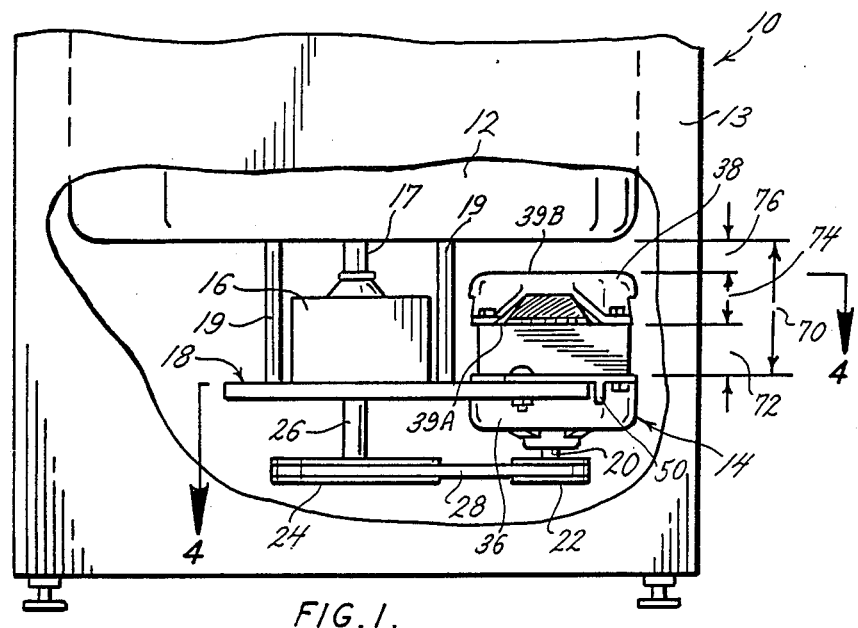
FIG. 1 is a partial cut-away front view of the present invention in the typical washing machine operating environment.

Referring now to the FIG. 1, a washing machine 10 is shown with the a tub 12, normally located within a cabinet 13 enclosing a dynamoelectric machine in the form of an electric motor 14 and a transmission 16 which conventionally are attached to a mounting plate 18.

The transmission 16 is shown operatively coupled to the tub 12 by means of a coupling 17. The mounting plate 18, which supports the motor 14 and the transmission 16 is attached to the bottom of the tub 12 by means of the supports 19. The mounting plate 18 also is attached to the washing machine cabinet 13 in a conventional manner. Also shown for purposes of understanding the overall spacial arrangement within the cabinet 13 are a shaft 20 of the motor 14, to which a drive pulley 22 is attached. By virtue of the motor mounting, which will be described hereinafter, to the mounting plate 18, the pulley 22 is maintained coplanar with a pulley 24 attached to a shaft 26 of the transmission 16. A drive belt 28, which extends between the motor pulley 22 and the transmission pulley 24, is shown for the purpose of emphasizing the necessity of maintaining the coplanar relationship between the two pulleys by means of the mounting arrangement among the motor 14, the transmission 16, and the horizontal mounting plate 18. As can be seen in FIG. 1, the overall spacing between the plate 18, to which a front endshield 36 is attached, and the bottom of the tub 12, that is, a distance 70, is composed of the material thickness of a mounting ear 50 of the front endshield 36; a distance 72 between the mounting ear 50 of the front endshield 36 and an inside surface 39A of a rear endshield 38 the distance 74 between the inside surface 39A of the rear endshield 38 and the outside surface 39B of said endshield, and finally a distance 76 between the outside surface 39B of the rear endshield 38 and the bottom of the tub 12.

Figure 2:
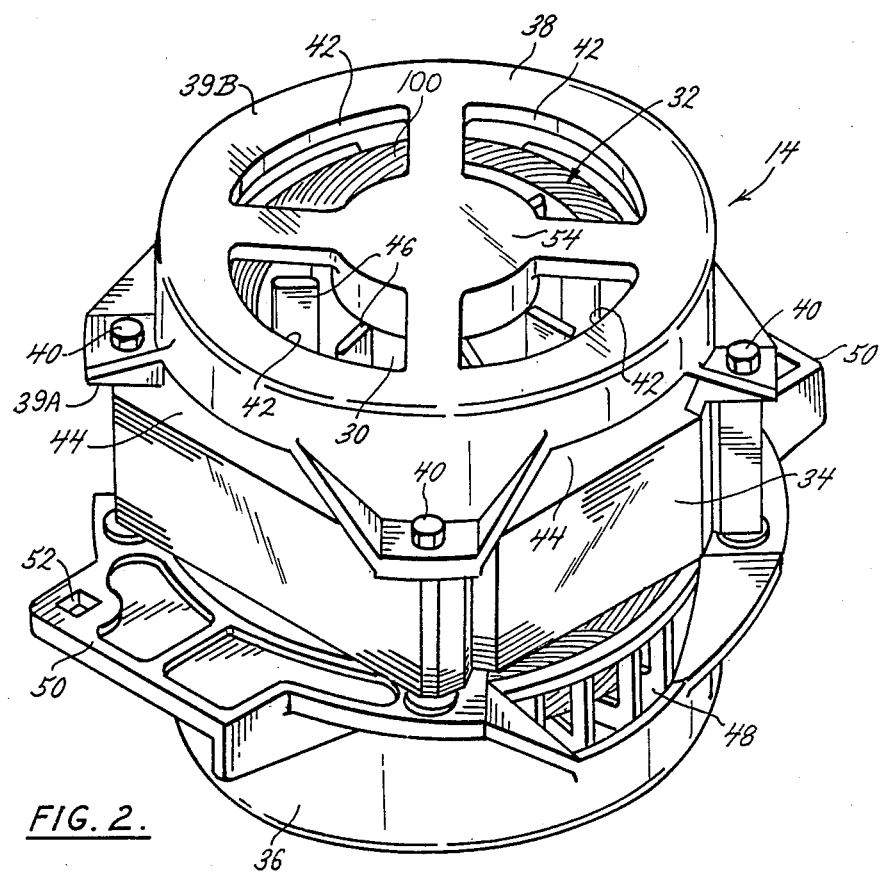
FIG. 2 is a view in perspective of one illustrative embodiment of motor assembly of this invention.

The motor assembly size, configuration, and mounting features are more clearly understood with reference to FIG. 2. The motor 14 includes a rotor assembly 30 within a stator 32. The stator assembly is constructed from a plurality of laminations 34 constructed from electrical sheet material. The laminations have slots formed in them, and windings 100 are placed in the slots. In the embodiment illustrated, the endshields 36 and 38 are attached directly to the stator assembly 32. The entire arrangement is held together by means of a plurality of stator bolts 40, which extend between the front endshield 36 through the laminations 34 to the rear endshield 38. Cooling for the motor 14 is provided by means of a plurality of symmetrically disposed curved trapezoidal apertures 42 in the rear endshield 38 and similar apertures in the front endshield 36, which permit axial air flow, and in addition, by a plurality of openings 44 in both of the endshields, which permit radial air flow. Additionally, the rotor 30 has plurality of rotor blades 46 extending axially within a stator cavity defined by the rear endshield 38 end lamination of the stator assembly 32. A fan 48, which is slightly visible in FIG. 2 through one of the radial apertures 44, is located within the cavity defined by the front endshield 36 and the end lamination of the stator assembly 32, and aids in cooling the windings of the stator assembly.

Of particular significance in FIG. 2, is the view of one of the mounting ears 50 on the front endshield 36. It should be noted that a square bolt hole 52 is located towards one side of the mounting ear 50. An identical square bolt hole 52 is similarly located in a corresponding mounting ear on the opposite side of the motor, as may be more clearly seen by reference to FIG. 4. It also should be obvious from FIG. 4, that the bolt holes 52 are equidistant from a vertical line 101 running from one mounting ear to the other through the center of the rear endshield 38, and that there are no corresponding mounting holes on the mounting ear 50 on the other side of that center line. FIGS. 1 and 2 also illustrate the importance of a flush bearing housing 54. With reference to FIG. 1, it is seen that by designing bearing housing 54 internal of the rear endshield 38 no distance is lost between the rear endshield 38 and the bottom of the tub 12. This space would be sacrificed to the extent of the distance needed by a protruding bearing housing, as is found in many competitor washing machine products.

FIG. 3 presents, in a cross-sectional view, the spacial and dimensional relationships between the various elements of the motor which must be accommodated in the various sizing and configuration variations needed for particular applications within the confined space beneath the tub 12 in the typical washing machine application depicted in FIG. 1. In FIG. 3 the effect of a projecting bearing housing 58 on the shaft end of the motor 30 is clearly visible. The position of the bearing housing 58 associated with the front endshield 36 does not, of course, have a substantial or meaningful effect in view of it location on the mounting plate 18 side of the motor 30, for several reasons. First, since the pulleys 22 and 24 must clear the plate 18 in any event, space limitations are not as critical on the drive end of the motor. Second, in application designs, the dimensions of the bearing housing can be chosen initially so that is is an aid in ensuring coplanar positioning of the pulleys. FIG. 3 illustrates that the motor assembly 14, and in particular, the stack height of the stator assembly may be varied in size from front to back depending upon the demands of the particular application, specifically the wash load size for the particular machine. The length dimension, as can be seen, is a function of all of the elements between the from endshield 36 and the rear endshield 38. These elements include the stator assembly 32, the rotor assembly 30, the rotor blades 46, and the fan 48. The flush bearing housing 54 in the rear endshield 38 contains a suitable bearing assembly 56. The front endshield 36 includes the front projecting bearing housing 58, which an contains a suitable bearing 60. The shaft 20 is journaled for rotation along the bearings 56 and 60. The rotor assembly 30 is constructed, and is mounted on the shaft 20 by any convenient method. Press on shrink fits work well, for example. The shaft 20 extends through the front endshield 36 along a shaft extension 27. As indicated, the rotor blades 46 are integrally formed with the rotor assembly 30 and are positioned along the rear endshield 38 side of the motor 14 to cool the motor 14. Likewise the fan 48 is located within the front endshield 46 for the purpose of cooling the motor 14. Details of fan 48 and motor 14 constructions are contained in copending application Ser. Nos. 227,145 and 227,177, assigned to the assignee of the present invention. Details of such constructions are intended to be incorporated by reference herein.

FIG. 4 shows in detail the arrangement between the motor 14 and the transmission 16 in regard to their mounting on mounting plate 18. FIG. 4 illustrates the rear endshield 38 as viewed from the bottom of the tub 12 looking towards the mounting plate 18. The supports 19 which hold the mounting plate in spaced relation to the bottom of the tub 12 are shown in cross-section. The belt 28 between the motor 14 and the transmission pulley 24, and the pulley 22 are shown in phantom. The mounting plate 18 is secured to the bottom of the tub 12 by means of the supports 19 so that the transmission shaft 26 is maintained parallel to the shaft 20 through the motor 14 co-located on the mounting plate 18. Specifics of the mounting of motor 14 to the mounting plate 18 are shown in FIG. 4. Thus the square bolt holes 52 in the mounting ears 50 on opposite sides of the motor 14 are shown. These square holes correspond with the slots 62 in the mounting plate 18 which permit the movement of the motor 14 relative to the mounting plate 18 so that appropriate tension may be applied to the belt 28 between the motor 14 and the transmission pulley 24. The motor 14 is placed within a mounting yoke 64 in mounting plate 18 and bolts with unslotted heads having a square cross-section shaft near their heads are placed in the bolt holes 52 in mounting ear 50 and extended through the slots 60 of mounting plate 1B whereupon they are then secured by means of nuts from the other side.

It should thus be obvious that by means of a simple two point mounting arrangement, the motor 14 is secured relative to the transmission 16 on mounting plate 18 by means of the mounting ears 50 which are an integral part of the front endshield 36 of the motor 14 so that the coplanar relationship between the motor pulley 22 and the transmission pulley 24 are maintained beneath the mounting plate 18 without being disturbed when the motor size or dimensions are changed in such a way that the portion of the motor 14 above the mounting plate 18 between the mounting plate and the bottom of the tub 12 are extended. Particular details of the mounting arrangement are set forth in Ser. No. 227,162 filed Aug. 2, 1988, which are incorporated herein by reference. Additional space is preserved by not having a bearing housing protrude from the rear endshield 38. All this is accomplished with the motor assembly that provides a maximum degree of growth flexibility while maintaining the desired level of cooling capacity and simplicity for producibility.

As thus described, my invention offers a great degree of flexibility in providing a highly efficient, reliable, simple, and easily producible motor design and mounting arrangement for a limited space type of application in the difficult vibration and frequently hot or warm air environment of the washing machine. Within the unique motor assembly invention defined and described herein, those skilled in the art will see the possibility of numerous variations within the scope and spirit of the present invention. For example, while particular materials were described as preferred, other materials may be used, if desired. Likewise, while the endshields 36 and 38 were described as directly mounted to the stator assembly of the motor 14, other mounting arrangements may be employed. The particular configuration of the ears 50 may be altered in other embodiments of this invention. These variations are merely illustrative.

Having thus described the invention, what is claimed and desired to be secured by Letters Patent is:

1. An electric motor and mounting assembly for supplying power to a transmission for a washing machine agitator and tub said motor being mounted in operating relationship with said transmission on a mounting plate attached to the washing machine structure, comprising:
   a stator assembly having a lamination centrally disposed rotor bore, slots opening on said bore, and windings in said slots,
   a rotor assembly disposed rotatably in said rotor bore and having a centrally located shaft extending therethrough, said shaft having bearings journaled on opposite ends of said rotor,
   a rear endshield for said motor, said endshield having an internally disposed, centrally located, flush bearing housing for rotatable containment of the bearing at one end of said rotor shaft, said endshield being operatively attached to said stator assembly,
   a front endshield for said motor, said endshield having a bearing housing with a centrally located circular opening, said housing projecting axially from the outside surface of said endshield for rotatable containment of the opposed bearing near the end of said rotor shaft extending through said opening external to said motor assembly, said endshield being operatively attached to said stator assembly, and means for mounting said motor attached to said front endshield for securing said motor, shaft extension downward, to said mounting plate; said transmission including a shaft mounted pulley, and a belt;
   a pulley mounted to said rotor shaft and engaged with said belt to drive said transmission, said mounting means attaching said motor to said mounting plate, so that said motor pulley is maintained in fixed planar relationship with respect to said transmission pulley.

2. The electric motor assembly of claim 1 wherein said means for mounting said motor to said mounting plate comprises at least one pair of mounting ears attached to and extending from said front endshield.

3. The electric motor assembly of claim 2 wherein said mounting ears are molded integrally with said front endshield.

4. The electric motor assembly of claim 3 wherein said endshields are cast from aluminum.

5. The electric motor assembly of claim 3 wherein said endshields are attached to said stator assembly, the laminations of the stator assembly being sandwiched therebetween.

6. The electric motor assembly of claim 5 wherein said rear endshield bearing housing is internal and flush with the outside surface of said rear endshield.

7. The electric motor assembly of claim 6 wherein the size of the lamination stack within said stator assembly can be increased within the confines of said front and rear endshields to the extent permitted by the distance between said rear endshield and the bottom of the tub without changing the relationship of said motor with respect to said mounting plate.

8. The electric motor assembly of claim 7 wherein said mounting means includes at least two ears on said front endshield, positioned on opposite sides of said motor, said ears each having a bolt hole, said bolt holes being aligned with opposing parallel slots in said mounting plate to permit motor movement relative to said transmission shaft for the purpose of setting drive belt tension between said motor and said transmission.

9. The electric motor assembly of claim 7 wherein said mounting means comprises at least one pair of planar mounting ears attached to and extending from opposite sides of said front endshield in a plane perpendicular to the rotational axis of said motor.

10. The electric motor assembly of claim 9 wherein said mounting ears are fabricated from cast aluminum integral with said front endshield.

11. The electric motor assembly of claim 10 wherein said front endshield has a plurality of symmetrically disposed apertures in its end wall.

12. The electric motor assembly of claim 11 wherein said symmetrically disposed apertures in said end wall are curved trapezoids in shape.

13. The electric motor assembly of claim 12 wherein said mounting plate has an open-end slot centered at one end of said plate to provide a mounting yoke for said motor supported therein by said mounting ears resting on said yoke.

14. The electric motor assembly of claim 13 wherein said front and rear endshields are secured to opposite ends of said stator assembly by means of a plurality of bolts extending through each of said endshields and said stator assembly in-between, the threaded end of each of said bolts extending through said assembly receiving a mating nut.

15. An electric motor assembly for supplying power to a transmission for an overlying washing machine tub, comprising:

a stator assembly having a centrally disposed bore, a rotor assembly having a centrally located shaft extending therethrough, said shaft being journaled in opposed bearings, and said rotor assembly being disposed rotatably within said stator bore, a pair of opposed motor endshields, one of which has an internal bearing housing flush with the external face of said endshield, and the other of which has a bearing housing with a centrally located opening to permit a rotor shaft extension therethrough for the attachment of a belt driving pulley, said bearing housings containing the respective bearings for journaling said rotor shaft, a mounting plate attached to and spaced from said tub, said mounting plate providing support to said motor and said transmission and having adjacent openings permitting their respective shafts to extend therethrough for the attachment of a belt pulley on each, and means attached to the end of said motor having said rotor shaft extension with said pulley thereon for securing said motor assembly to said mounting plate so said motor pulley is maintained in a fixed planar relationship with respect to said transmission pulley.

* * * * *